United States Patent [19]
Yahiaoui et al.

[11] Patent Number: 5,540,979
[45] Date of Patent: Jul. 30, 1996

[54] POROUS NON-WOVEN BOVINE BLOOD-OXALATE ABSORBENT STRUCTURE

[76] Inventors: Ali Yahiaoui, 2003 Harbour Landing, Roswell, Ga. 30076; David C. Potts, 5268 Wynterhall Ct., Dunwoody, Ga. 30338; Cheryl A. Perkins, 4977 Farihaven Way, Roswell, Ga. 30075; Michael D. Powers, 813 Vinson Ct., Woodstock, Ga. 30188; Jerald T. Jascomb, 3022 Steeplechase, Alpharetta, Ga. 30201

[21] Appl. No.: 242,948

[22] Filed: May 16, 1994

[51] Int. Cl.$^6$ .................................................. B32B 7/00
[52] U.S. Cl. .................. 428/212; 428/304.4; 428/308.8; 428/314.8; 428/316.6; 428/311.5; 428/373; 428/374; 128/849
[58] Field of Search .............................. 428/304.4, 308.8, 428/314.8, 316.6, 212, 311.5, 373, 374; 128/849

[56] References Cited

U.S. PATENT DOCUMENTS

| | | | |
|---|---|---|---|
| Re. 27,710 | 7/1973 | Melges | 128/132 |
| 3,182,656 | 5/1965 | Pyne | 128/132 |
| 3,410,266 | 11/1968 | Krzewinski et al. | 128/132 |
| 3,423,266 | 1/1969 | Davies et al. | 156/167 |
| 3,538,912 | 11/1970 | Becker | 128/132 |
| 3,561,439 | 2/1971 | Bayer | 128/132 |
| 3,668,050 | 6/1972 | Donnelly | 161/39 |
| 3,669,106 | 6/1972 | Schrading et al. | 128/132 D |
| 3,692,618 | 9/1972 | Dorschner et al. | 161/72 |
| 3,766,913 | 10/1973 | Balin | 128/132 D |
| 3,791,381 | 2/1974 | Krzewinski | 128/132 D |
| 3,799,161 | 3/1974 | Collins | 128/132 D |
| 3,802,817 | 4/1974 | Matsuki et al. | 425/66 |
| 3,837,995 | 9/1974 | Floden | 161/150 |
| 3,856,006 | 12/1974 | Krzewinski | 128/132 D |
| 3,881,474 | 5/1975 | Krzewinski | 128/132 D |
| 3,902,484 | 9/1975 | Winters | 128/132 D |
| 3,910,268 | 10/1975 | Miller | 128/132 D |
| 3,926,185 | 12/1975 | Krzewinski | 128/132 D |
| 3,930,497 | 1/1976 | Krebs et al. | 128/132 D |
| 3,942,523 | 3/1976 | Rudtke | 128/132 D |
| 3,952,738 | 4/1976 | Krzewinski | 128/132 D |
| 3,955,569 | 5/1976 | Krzewinski et al. | 128/132 D |
| 4,024,862 | 5/1977 | Collins | 128/132 D |
| 4,027,665 | 6/1977 | Scrivens | 128/132 D |
| 4,033,341 | 7/1977 | Scrivens | 128/132 D |
| 4,041,203 | 8/1977 | Brock et al. | 428/157 |
| 4,041,942 | 8/1977 | Dougan et al. | 128/132 D |
| 4,081,582 | 3/1978 | Butterworth et al. | 428/284 |
| 4,082,886 | 4/1978 | Butterworth et al. | 428/284 |
| 4,119,093 | 10/1978 | Goodman | 128/132 D |

(List continued on next page.)

FOREIGN PATENT DOCUMENTS

| | | |
|---|---|---|
| 969439 | 6/1975 | Canada . |
| 0474123 | 3/1992 | European Pat. Off. . |
| 0604738 | 7/1994 | European Pat. Off. . |
| 2282101 | 3/1995 | United Kingdom . |
| 95/03172 | 4/1980 | WIPO . |

*Primary Examiner*—Stevan A. Resan

[57] ABSTRACT

There is disclosed a porous non-woven absorbent structure formed from fibers. The porous structure has a basis weight within the range of at least about 0.25 osy to about 10.0 osy a density of at least about 0.01 g/cc to about 0.15 g/cc. The porous structure is adapted such that upon the application of at least 2 ml of fluid Bovine blood-oxalate to a surface thereof, substantially all of said fluid enters the bulk of the porous structure within about 45 seconds. The porous structure may be single layered or include multiple layers. The single layered structure is formed from spunbonded thermoplastic fibers which include a hydrophilic internal additive. The multiple layered structure is formed by laminating a spunbonded web to a second layer. The second may be formed from natural or synthetic fibers. When formed from synthetic fibers, the second layer is generally formed from meltblown fibers which may also include a hydrophobic internal additive. The fibers forming either the spunbond or the meltblown layers may be mono-component or bi-component. In some applications, a liquid impervious film may be secured to a surface of the second layer.

36 Claims, 4 Drawing Sheets

U.S. PATENT DOCUMENTS

| | | | |
|---|---|---|---|
| 4,134,398 | 1/1979 | Scrivens | 128/132 D |
| 4,169,472 | 10/1979 | Morris | 128/132 D |
| 4,196,245 | 4/1980 | Kitson et al. | 428/198 |
| 4,196,723 | 4/1980 | Moose, Jr. | 128/132 D |
| 4,204,532 | 5/1980 | Lind et al. | 128/132 D |
| 4,239,792 | 12/1980 | Ludwa | 428/198 |
| 4,263,363 | 4/1981 | Buck et al. | 428/284 |
| 4,275,105 | 6/1981 | Boyd et al. | 428/198 |
| 4,287,251 | 9/1981 | King et al. | 428/198 |
| 4,298,649 | 11/1981 | Meitner | 428/198 |
| 4,355,066 | 10/1982 | Newman | 428/198 |
| 4,379,192 | 4/1983 | Wahlquist et al. | 428/156 |
| 4,383,476 | 1/1995 | Peimer et al. | 128/849 |
| 4,466,430 | 8/1984 | Shultz | 128/132 D |
| 4,479,492 | 10/1984 | Singer | 128/132 D |
| 4,489,720 | 12/1984 | Morris et al. | 128/132 D |
| 4,522,203 | 6/1985 | Mays | 128/132 D |
| 4,547,420 | 10/1985 | Krueger et al. | 428/229 |
| 4,553,539 | 11/1985 | Morris | 128/132 D |
| 4,595,629 | 6/1986 | Mays | 428/286 |
| 4,596,245 | 6/1986 | Morris | 128/132 D |
| 4,607,631 | 8/1986 | Hanssen | 128/132 D |
| 4,616,642 | 10/1986 | Martin et al. | 128/132 D |
| 4,627,427 | 12/1986 | Arco | 128/132 D |
| 4,664,103 | 5/1987 | Martin et al. | 128/132 D |
| 4,668,566 | 5/1987 | Braun | 428/286 |
| 4,699,620 | 10/1987 | Bernardin | 604/385 A |
| 4,713,068 | 12/1987 | Wang et al. | 604/366 |
| 4,729,371 | 3/1988 | Krueger et al. | 128/206.19 |
| 4,730,609 | 3/1988 | McConnell | 128/132 D |
| 4,758,239 | 7/1988 | Yeo et al. | 604/366 |
| 4,778,460 | 10/1988 | Braun et al. | 604/380 |
| 4,795,668 | 1/1989 | Krueger et al. | 428/174 |
| 4,828,556 | 5/1989 | Braun et al. | 604/365 |
| 4,904,521 | 2/1990 | Johnson et al. | 428/284 |
| 4,906,513 | 3/1990 | Kebbell et al. | 428/198 |
| 5,108,827 | 4/1992 | Gessner | 428/219 |
| 5,114,787 | 5/1992 | Chaplin et al. | 428/284 |
| 5,145,727 | 9/1992 | Potts et al. | 428/198 |
| 5,149,576 | 9/1992 | Potts et al. | 428/198 |
| 5,151,314 | 9/1992 | Brown | 428/198 |
| 5,165,979 | 11/1992 | Watkins et al. | 428/113 |
| 5,178,931 | 1/1993 | Perkins et al. | 428/198 |
| 5,178,932 | 1/1993 | Perkins et al. | 428/198 |
| 5,204,174 | 4/1993 | Daponte et al. | 428/286 |
| 5,222,507 | 6/1993 | Taylor | 128/849 |
| 5,229,191 | 7/1993 | Austin | 428/198 |
| 5,232,770 | 8/1993 | Joseph | 428/284 |
| 5,238,733 | 8/1993 | Joseph et al. | 428/284 |
| 5,241,009 | 8/1993 | Yarbrough et al. | 525/327.8 |
| 5,244,482 | 9/1993 | Hassenboehler et al. | 55/528 |
| 5,271,883 | 12/1993 | Timmons et al. | 264/6 |
| 5,294,482 | 3/1994 | Gessner | 428/287 |
| 5,341,821 | 8/1994 | DeHart | 128/849 |
| 5,348,547 | 9/1994 | Payne et al. | 604/378 |
| 5,394,891 | 3/1995 | Mills et al. | 128/852 |
| 5,398,700 | 3/1995 | Mills et al. | 128/853 |
| 5,454,381 | 10/1995 | DeHart | 128/849 |
| 5,455,074 | 10/1995 | MacDonald et al. | 427/386 |
| 5,460,884 | 10/1995 | Kobylivker et al. | 428/373 |

PORUS NON-WOVEN BOVINE BLOOD-OXALATE ABSORBENT STRUCTURE

FIELD OF THE INVENTION

The present invention is directed to porous absorbent structures and more particularly to absorbent structures formed in part from fibers. Such absorbent structures are useful in the fields of professional health care and personal care, such as infant care, adolescent care and adult care.

BACKGROUND OF THE INVENTION

Nonwoven fabrics are used to make a variety of products which desirably have particular properties, such as for example softness, strength, uniformity, thickness, and absorbency. Such products include towels, industrial wipes, incontinence products, infant and adolescent care products such as diapers, absorbent feminine care products, garments such as medical apparel, and professional health care fabrics such as surgical draping. In many of these products, considerable time, effort and expense are dedicated to improving the products fluid management capabilities.

The fluid management capabilities of a product may be considered to be the product's ability to not only absorb a fluid but also to coach or channel the absorbed fluid to a preferred location within the product for storage. For example, in products such as diapers and feminine care products, fluid retention at the interface between the body and the product is generally not desired. It is generally preferred that such products be designed to rapidly absorb and then draw such fluids away from the body/product interface. A material layer which rapidly absorbs and then moves a fluid away from the body is sometimes referred to as a "surge" layer. Once the fluids have been absorbed and drawn away from the body, the fluids are preferably channeled towards and into one or more storage layers. These storage layers desirably hold or contain such fluids while minimizing reabsorption of these fluids by the surge layer.

In some instances, the product may be required to withstand multiple fluid insults or wettings before being replaced. As such, the designers and engineers of such products are constantly challenged to develop and/or refine materials which not only adequately surge, channel and retain fluids from an initial wetting but which adequately manage fluids from subsequent wettings. The designers' and engineers' tasks are made more formidable in view of (i) the hydrophobic nature of numerous materials traditionally used in the above products and (ii) the business and economic realities of producing such products for disposable markets.

Therefore, there exists a need for materials and particularly polymeric materials having improved fluid management capabilities as well as efficient and economical methods for making the same.

SUMMARY OF THE INVENTION

In response to the above problems encountered by those skilled in the art, the present invention provides a fluid absorbent porous structure. The present invention provides a porous structure capable of absorbing at least 2 milliliters of fluid Bovine blood-oxalate in less than 45 seconds and having a density of at least about 0.01 g/cc and a basis weight of at least about 0.25 osy. The porous structure of the present invention is generally formed from fibers and has a basis weight within the range of at least about 0.25 osy (ounces per square yard) to about 10.0 osy and a density of at least about 0.01 g/cc (grams per cubic centimeter) to about 0.15 g/cc. In one embodiment, the porous structure is adapted such that upon the application of at least 2 ml of fluid Bovine blood-oxalate to a surface thereof, substantially all of said fluid enters the bulk of the porous structure within about 45 seconds.

In another embodiment, the porous structure is adapted such that upon the application of at least 2 ml of fluid Bovine blood-oxalate to a surface thereof, substantially all of said fluid enters the bulk of the porous structure within about 150 seconds. The porous structure is further adapted such that after about 5 minutes from the moment all of said fluid enteres the undisturbed bulk of said porous structure, less than about 25% and more particularly, less than about 20%, and still more particularly between about 15 to about 8% of the fluid Bovine blood-oxalate is retained by said porous structure.

In another embodiment, the porous structure includes two layers which are generally in a juxtaposed and contacting relationship with each other. A first porous layer may be formed from fibers and has a basis weight and density within the ranges described above. Desirably, these fibers may be melt-extruded thermoplastic fibers formed by spunbonding and include a hydrophilic internal additive.

The fibers of the first porous layer may function so as to "surge" fluids in contact therewith. These fibers may be formed and arranged such that said contacting fluids are rapidly absorbed by the first layer, distributed within the first layer and urged by the first layer towards the second porous layer.

The second porous layer may be formed such that it may receive the urged aqueous fluid from the first porous layer. The second porous layer may also be formed from melt-extruded thermoplastic fibers, and more particularly melt-extruded thermoplastic fibers which are formed by melt-blowing. Additionally, the second porous layer may also be formed from natural fibers or a combination of natural and synthetic fibers.

The melt-extruded fibers of the present invention may be homo-polymeric, co-polymeric, bi- or multi-component polymeric or polymer blends. In one embodiment, these fibers may further be formed through appropriate processes such that they are spiral-shaped.

When the fibers are bi- or multi-component, one of the components may be homo-polymeric, co-polymeric, or a polymer blend. The orientation of individual components, such as a first and a second component, may be sheath-core or side-by-side.

Desirably, the first component of a multi-component fiber may be formed from a polyolefin and desirably a polyolefin homo-polymer. And more desirably, the first component may be formed from polypropylene. Another component, or second component, of a bi-component fiber may be formed a polyolefin and more desirably from either a linear low density polyethylene, high density polyethylene, a co-polymer of propylene and ethylene or a combination of polypropylene and polyethylene. The combination of polypropylene and polyethylene may be in the form of either a block polymer or a polymer blend. When formed from a co-polymer of propylene and ethylene, the percent by weight of propylene may range from about 90% to about 99.9% and the percent by weight of ethylene may range from about 0.1% to about 10%.

Desirably, the hydrophilic internal additive suitable for use in the present invention is generally non-toxic and has a low volatility. Additionally, the hydrophilic internal additive should be thermally stable at temperatures up to 300° C., and sufficiently soluble in the molten or semi-molten polymer. The hydrophilic internal additive should also sufficiently phase separate such that said additive migrates from the bulk of the polymer fiber towards the surface of the polymer fiber as the fiber cools without requiring the addition of heat. Once at the polymer surface, the hydrophilic internal additive desirably changes the hydrophobicity of the polymer surface such that the polymer to which it is added rapidly wets upon contact with an aqueous fluid.

Examples of such internal additives include one or a combination thereof selected from the following classes of internal additives: (i) polyoxyalkylene modified fluorinated alkyls, (ii) polyoxyalkylene fatty acid esters, (iii) polyoxyalkylene modified polydimethyl siloxanes and (iv) PEG-Terephthalate (polyethylene glycol modified terephthalate). An example of a polyoxyalkylene modified fluorinated alkyl is FC-1802, a product of the Minnesota Mining and Manufacturing Company. An example of a polyoxyalkylene fatty acid ester is PEG-400 ML, a product of Henkel Corporation/Energy Group. An example of a polyoxyalkylene modified polydimethyl siloxane is MASIL® SF-19, a product of PPG Industries.

In another embodiment of the present invention, the porous structure includes at least two layers in a juxtaposed and contacting relationship wherein each layer is a nonwoven layer formed from melt-extruded thermoplastic fibers. A hydrophilic internal additive, as described above, may be present in fibers forming one or both of the nonwoven porous layers.

A first porous layer may be formed from fibers and have a basis weight and density within the ranges described above. The first porous layer may function so as to "surge" an aqueous fluid. These fibers may be formed and arranged such that an aqueous fluid contacting these fibers is rapidly absorbed and distributed within the first layer and ultimately urged towards the second porous layer. The pore size of the first porous layer may be larger than the pore size of the second porous layer. The fibers of the first porous layer may be formed by spunbonding.

The second porous layer is formed such that the fibers of the second porous layer receive and retain the aqueous fluid urged theretowards by the first porous layer. The fibers of the second porous layer may be formed by a meltblowing process. The second porous layer may also have a basis weight and density within the ranges described above, provided however, that there exist a difference in the surface energies and/or pore size between the first and the second porous layers.

In another embodiment, the present invention provides a surgical drape. The surgical drape includes a sheet having an opening therein. A porous structure is secured to the sheet around and/or adjacent said opening. The porous structure may function to reinforce and/or provide improved aqueous fluid management. Such aqueous fluids may originate from beneath or above the opening as well as in the general proximity thereof.

The porous structure includes at least two porous layers. The two layers are generally in a juxtaposed and contacting relationship with each other. A first porous layer may be formed from melt-extruded thermoplastic fibers having a basis weight within the range described above. These fibers may be formed by a spunbonding process and may include a hydrophilic internal additive as described above.

The fibers of the first porous layer may function so as to "surge" an aqueous fluid towards a second porous layer. The melt-extruded fibers of the first porous layer, as described above, may be homo-polymeric, co-polymeric or bi-component polymeric and may further be helical or spiral.

The fibers of the second porous layer may also be formed from melt-extruded thermoplastic fibers and have a basis weight and density within the ranges described above. These fibers may be formed by meltblowing and may include a hydrophilic internal additive similar to those described above. The second porous layer may function as a storage layer in which case these fibers may be formed and arranged so that this layer can receive and retain the urged aqueous fluid from the first porous layer. Additionally, the pore size of the first porous layer may be larger than the pore size of the second porous layer. The fibers of the second porous layer may be either bi-component or mono-component. If mono-Component, these fibers may be formed from polypropylene.

In still another embodiment, the present invention provides a sanitary napkin. The sanitary napkin includes a top cover and a bottom cover which capture a three layered, porous absorbent structure. A portion of one of the covers is liquid permeable for permitting fluid in contact therewith to enter the absorbent structure.

The intermediate layer of the absorbent structure is in a juxtaposed and contacting relationship with the two outer layers. One of the outer layers may be formed from fibers and may function so as to surge an aqueous fluid in contact therewith towards the middle layer. The fibers forming this surge layer may be similar to the fibers described above for forming other surge layers.

The intermediate layer may function as a storage layer and may be similar to the fibers described above for forming other storage layers.

The other outer layer may be formed from natural or synthetic fibers, including cellulose fibers, regenerated cellulose or cotton fibers, or co-form fibers. This layer functions to receive and store fluids from the intermediate layer.

DETAILED DESCRIPTION OF THE INVENTION

Figure 1:
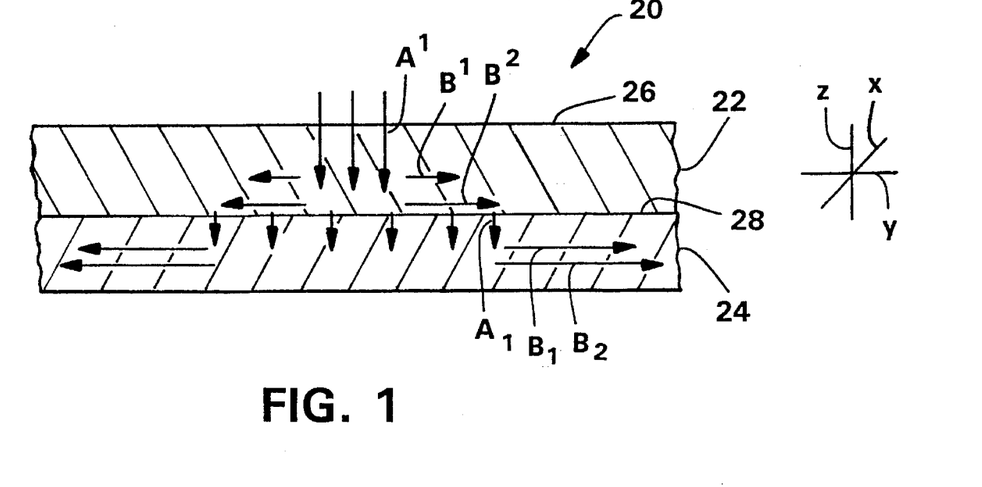
FIG. 1 is a cross sectional view of the absorbent structure of the present invention.

Referring to FIG. 1, a porous absorbent structure 20 is illustrated having a first porous layer 22 in a juxtaposed and contacting relationship with a second porous layer 24. The pore size of the first porous layer 22 may be larger than the pore size of the second porous layer 24. The first and second porous layers, 22 and 24 respectively, may be a nonwoven fabric formed from fibers. More particularly, said nonwoven fabric may be formed from fibers formed from one or more melt-extruded thermoplastic polymers.

As described in greater detail below, the first porous layer 22 and the second porous layer 24 may be so formed and adapted such that 2 ml of Bovine blood-oxalate applied to the first porous layer 22 is completely absorbed by the absorbent structure 20 within about 180 seconds and more particularly, within about 150 seconds. Additionally, the first porous layer 22 may be further modified such that upon the passage of about 5 minutes from the moment the Bovine blood-oxalate enters the undisturbed absorbent structure 20, less than 25%, and more particularly less than 20% and still more particularly between about 15 to about 8% of said fluid is retained by the first porous layer 22. The second porous layer 24 may be so formed and adapted such that upon the passage of about 5 minutes from the moment the Bovine blood-oxalate enters the undisturbed absorbent structure 20, greater than about 75% and more particularly greater than about 80% and still more particularly between about 85 to about 92% of said fluid is retained by the second porous layer 24.

By way of example only, thermoplastic polymers may include, end-capped polyacetals, such as poly(oxymethylene) or polyformaldehyde, poly(trichloroacetaldehyde), poly(n-valeraldehyde), poly(acetaldehyde), poly(propionaldehyde), and the like; acrylic polymers, such as poly(ethyl acrylate), poly(methyl methacrylate), and the like; fluorocarbon polymers, such as perfluorinated ethylene-propylene copolymers, ethylene-tetrafluoroethylene copolymers, poly-(chlorotrifluoroethylene), ethylene-chlorotrifluoroethylene copolymers, poly(vinylidene fluoride), poly(vinyl fluoride), and the like; polyamides, such as poly(6-aminocaproic acid) or poly($\epsilon$-caprolactam), poly(hexamethylene adipamide), poly(hexamethylene sebacamide), poly(11-aminoundecanoic acid), and the like; polyaramides, such as poly(imino-1,3-phenyleneiminoisophthaloyl) or poly(m-phenylene isophthalamide), and the like; parylenes, such as poly-p-xylylene, poly(chloro-p-xylylene), and the like; polyaryl ethers, such as poly(oxy-2,6-dimethyl-1,4-phenylene) or poly(p-phenylene oxide), and the like; polyaryl sulfones, such as poly(oxy-1,4-phenylenesulfonyl-1,4-phenyleneoxy-1,4-phenylene-isopropylidene-1,4-phenylene), poly(sulfonyl-1,4-phenyleneoxy-1,4-phenylenesulfonyl-4,4'-biphenylene), and the like; polycarbonates, such as poly(bisphenol A) or poly(carbonyldioxy-1,4-phenyleneisopropylidene-1,4-phenylene), and the like; polyesters, such as poly(ethylene terephthalate), poly(tetramethylene terephthalate), poly-(cyclohexylene-1,4-dimethylene terephthalate) or poly(oxymethylene-1,4-cyclohexylenemethyleneoxyterephthaloyl), and the like; polyaryl sulfides, such as poly(p-phenylene sulfide) or poly(thio-1,4-phenylene), and the like; polyimides, such as poly(pyromellitimido-1,4-phenylene), and the like; polyolefins, such as polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polychloroprene, polyacrylonitrile, poly(vinyl acetate), poly(vinylidene chloride), polystyrene, and the like; copolymers of the foregoing, such as a polypropylene-ethylene, polypropylenepolyethylene, polyethylenepolyvinyl alcohol, acrylonitrile-butadiene-styrene (ABS) copolymers, and the like; and the like.

The first layer 22 may be a nonwoven fabric formed from melt-extruded thermoplastic polymer fibers and have a basis weight of at least about 0.25 osy and a density of at least about 0.01 g/cc. More particularly, the basis weight and density of the first layer 22 may range from between about 0.25 to about 10.0 osy and about 0.01 to about 0.15 g/cc, respectively, and still more particularly from between about 0.5 to about 5 osy and about 0.01 to about 0.1 g/cc, respectively and still more particularly from between about 1.0 to about 3 osy and about 0.01 to about 0.08 g/cc, respectively. The fibers forming the first layer 22 may further include a hydrophilic internal additive. Alternatively, the first layer may be formed from a porous thermoplastic film having a hydrophilic internal additive or a porous foam having a hydrophilic internal additive.

The first layer 22 may be adapted such that upon the application of at least 2 ml of fluid Bovine blood-oxalate to a surface thereof, substantially all of said fluid enters the bulk of the porous structure within about 45 seconds. The first layer 22 may be further adapted such that upon the application of at least 2 ml of fluid Bovine blood-oxalate to a surface thereof, substantially all of said fluid enters the bulk of the porous structure within about 150 seconds and that after about 5 minutes from the moment all of said fluid enters the undisturbed bulk of the first layer 22, less than about 25% and more particularly, less than about 20%, and still more particularly between about 15 to about 8% of the fluid Bovine blood-oxalate is retained by the first layer 22.

Desirably, the first layer 22 is a nonwoven fabric which may be formed from a variety of processes including, but not limited to, air laying processes, wet laid processes, hydroentangling processes, spunbonding, meltblowing, staple fiber carding and bonding, and solution spinning. It has been found that nonwovens formed from polyolefin-based fibers are particularly well-suited for the above applications. When the first porous layer 22 is a porous film, said porous film may be formed by any one of several porous film forming processes known to those skilled in the art. When the first porous layer 22 is a porous foam, said porous foam may be formed by any one of several foam forming processes known to those skilled in the art.

There are several types of polymer fibers useful for forming the first porous layer 22. Such fibers may be homo-polymeric, co-polymeric, bi-or multi-component polymeric or a blend of polymers. Polymers particularly well suited for forming such fibers include, for example, polyolefins, polyesters, such as PET, PVT and PBT, rayon, and polyamides such as nylons. More particularly, examples of suitable polyolefins include polypropylene, and polyethylene, and polymers combinations, such as polypropylene/polyethylene, polypropylene/ethylene and polypropylene/polybutylene.

With continued reference to FIG. 1, the fibers of the first porous layer 22 may function so as to "surge" fluids in contact therewith. These fibers may be formed and arranged such that fluids contacting these fibers are rapidly absorbed and distribute within the first porous layer 22 and, once in the bulk of the first porous layer, are urged towards the second porous layer 24 as described in greater detail below. In one embodiment, the fibers of the first porous layer 22 are formed by spunbonding such that the resulting fibers are substantially continuous.

The second porous layer 24 may be formed such that the surface energy and/or pore size of the second porous layer 24 differs from the first porous layer 22. Generally, it is desirable that the pore size and/or the surface energy of the first porous layer 22 be greater than the surface energy and/or pore size of the second porous layer 24. In this way, the second porous layer 24 may receive and distribute the aqueous fluid urged from the first porous layer.

The second porous layer 24 may also be formed from the melt-extruded thermoplastic fibers describe for forming the fibers of the first porous layer 22. More particularly, the second porous layer 24 may be formed from melt-extruded thermoplastic fibers which are formed by meltblowing. The second layer 24 may have a basis weight of at least about 0.25 osy and a density of at least about 0.01 g/cc. More particularly, the basis weight and density of the first layer 22 may range from between about 0.25 to about 10.0 osy and about 0.01 to about 0.15 g/cc, respectively, and still more particularly from between about 0.5 to about 5 osy and about 0.01 to about 0.1 g/cc, respectively and still more particularly from between about 1.0 to about 3 osy and about 0.01 to about 0.08 g/cc, respectively.

In some embodiments, the meltblown thermoplastic fibers forming the second porous layer may have a diameter range from between about 0.2 to about 10 microns. The fibers forming the second layer may also be formed from natural fibers, such as for example, cellulose fibers, wood pulp fibers, regenerated cellulose, cotton fibers, hydroentangled fluff pulp, fluff pulp, tissue and the like. Additionally, fibers forming the second porous layer may also be formed from a combination of synthetic fibers and natural fibers. Such a combination of natural and synthetic fibers is generally referred to as co-form fibers.

Additionally, the thermoplastic meltblown fibers forming the second layer may also be bi- or multi-component fibers. Bi- or multi-component meltblown thermoplastic fibers and methods of making the same are disclosed in U.S. Pat. Nos. 5,238,733, 5,232,770, 4,547,420, 4,729,371, and 4,795,668, all of which are assigned to Minnesota Mining and Manufacturing Company and are herein incorporated by reference.

The concepts of absorbing and distributing a fluid within the first porous layer may be better understood by reference to the lines labeled $A^1$, $B^1$ and $B^2$ in the layer 22 and the lines labeled $A_1$, $B_1$ and $B_2$ in the layer 24. The $A^1$ lines represent fluid travel within the layer 22 along the z axis while the $B^1$ and $B^2$ lines represent fluid travel within the layer 22 along the x and y axes at various depths within the layer 22. It will be understood that while the fluid flow behavior for purposes of illustration in FIG. 1 is explained by a rather general three dimensional model, a more precise explanation of the fluid flow behavior is possible and would require the use of a generally more complex three dimensional model.

Additionally, by varying lengths of each such line, it is intended to illustrate fluid flow and depth of penetration into the layers 22 and 24 in the respective directions over an elapsed period of time. For example, by illustrating the $A^1$ line as having a greater length than the $B^1$ line, it is suggested that upon contacting the upper surface 26 of the first layer 22 with a fluid and the passage of a period of time, a greater quantity of such fluid moves along the z axis, the $A^1$ line, than along the x and y axes, the $B^1$ line, at the relative position of the $B^1$ line within the first layer 22. Additionally, as the length of the $B^2$ line is greater than the $B^1$ line, it is suggested that as the fluid traverses the bulk of the first layer 22 along the z axis, the migration or distribution of such fluid within the bulk of layer 22 along the x and y axes increases.

Furthermore, upon the passage of sufficient time such that the fluid contacting the first layer 22 crosses the interface 28 of the first and second layers, 22 and 24, respectively, there occurs a greater fluid distribution in the second layer 24 along the x and y axes, as illustrated by the $B_1$ and $B_2$ lines than along the z axis, as illustrated by the $A_1$ line.

Therefore, while the first layer 22 is generally referred to as a "surge" layer which suggest significant fluid movement along the z axis, fluid distribution along the x and y axes, within the first layer 22 prior to such fluid contacting the second layer 24 is also desirable. For example, a surge layer providing minimal fluid distribution along the x and y axes generally results in a generally localized or focused deposition of such fluid at the interface of the surge layer and a storage layer. To prevent the pooling or run-off of fluid, the z directional fluid flow of the storage layer, in this case the second layer 24, must be adequate to uptake the fluid at the interface 28 before pooling or run-off occurs. Adequate z directional fluid flow is achieved by varying the surface energy and/or pore size of the storage layer with respect to the surge layer such that generally the value of the surface energy and/or the pore size of the storage layer is less than that of the surge layer. However, in this example, having sufficient fluid flow in z direction of the storage layer may not be achieved without a tradeoff to the fluid flow in the x and y directions of this same layer. As such, providing sufficient fluid flow in the z direction may reduce the fluid flow in the x and y directions and thus reduce the fluid storage capacity of the storage layer. One solution to recapturing lost storage capacity is to manufacture a loftier and generally thicker storage layer. However, there are several disadvantages to this solution. Some of these disadvantages include additional time and costs of manufacture and a bulkier absorbent product.

This problem may be avoided by providing a surge layer which not only permits adequate fluid movement along the z axis, but also along the x and y axes. In this way, the localized deposition of fluid upon the storage layer is avoided. As such, the fluid traversing the surge layer is deposited over a greater area along the interface between the surge layer and the storage layer. In turn, such fluid deposition at the interface of the surge and storage layers may permit the use of a thinner or a less loftier storage layer. This is so because the requirement for movement of fluid along the z axis in the storage layer is reduced by the migration of such fluid along the x and y axes of the surge layer prior to the contact of such fluid with said storage layer.

Another advantage of sufficient fluid movement along the x and y axes of the surge layer is improved stain masking without the addition of an separate stain masking layer. Improved stain masking is achieved by avoiding localized deposition of a staining fluid by the surge layer on to the storage layer. Sufficient fluid distribution along the x–y axes within the surge layer prior to transfer to the storage layer disperses the staining fluid over a larger area which in turn reduces or dilutes the color intensity of such fluid.

Figure 2:
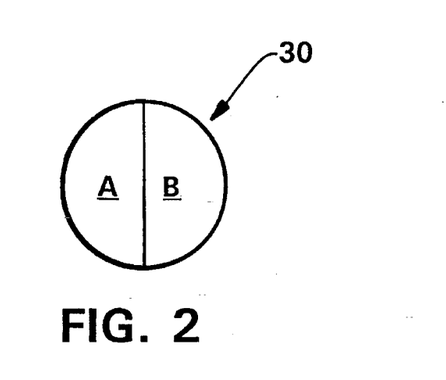
FIG. 2 is a schematic drawing of a cross section of a bi-component filament illustrating a side-by-side arrangement of components.
Figure 3:
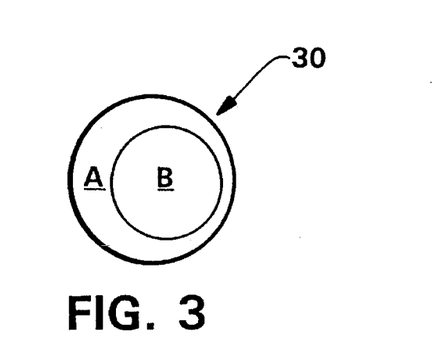
FIG. 3 is a schematic drawing of a cross section of a bi-component filament illustrating a sheath/core arrangement.

Referring now to FIGS. 2 and 3, when fibers 30 forming the first layer 22 are bi-component, first and second components A and B may be arranged in a side-by-side orientation as illustrated in FIG. 2 or in a sheath/core orientation as illustrated in FIG. 3.

Referring now to FIG. 2, while the components A and B of the bi-component fiber 30 are illustrated as being substantially equal in proportion and orientation about the fiber 30, it will be understood that a side-by-side orientation occurs when a portion of each component, A and B, share a portion of the fiber's periphery throughout substantially the entire length of the fiber 30. Referring to FIG. 3, it will be further understood that the arrangement of components A and B in a sheath/core orientation occurs when one of the components occupies the entire periphery of the fiber 30 throughout substantially the entire length of the fiber 30.

Furthermore, in the case of bi-component fibers, the first and second components may be homo-polymeric, co-polymeric or a blend of two or more different polymers. Desirably, the first component A of the bi-component fiber 30 is formed from a homo-polymer. And more desirably, the first component A is formed from polypropylene.

Desirably, the second component B of the bi-component fiber 30 may be formed from either linear low density polyethylene, high density polyethylene, a co-polymer of propylene and ethylene or a combination of polypropylene and polyethylene. The combination of polypropylene and polyethylene may be in the form of a polymer blend or block polymer. When formed from a co-polymer of propylene and ethylene, the percent by weight of propylene ranges from about 90 to about 99.9 and the percent by weight of ethylene ranges from about 0.1 to about 10 and more particularly the percent by weight of propylene ranges from about 95 to about 99.5 and the percent by weight of ethylene ranges from about 0.5 to about 5.0. Still more particularly, the percent by weight of propylene may range from about 96 to about 98.5 and the percent by weight of ethylene ranges from about 1.5 to about 4.0. When the second component B is formed from a combination of polypropylene and low density polyethylene, the percentage by weight of polypropylene ranges from about 20% to about 80% and the percent by weight of low density polyethylene ranges from about 20% to about 80%.

In some instances, the bi-component polymeric fibers described above may further be formed, through appropriate processes, into either spiral-shaped, or helical-shaped fibers. When the spiral form is desired, the polymer components, A and B, are generally selected so that the resulting bi-component filament is capable of developing a natural spiral. This is accomplished by selecting the polymer components A and B such that each component has a sufficiently different melting temperature. For example, when component A is formed from polypropylene and component B is formed from polyethylene, the bi-component fiber 30 may comprise from about 20% to about 80% by weight polypropylene and from about 20% to about 80% polyethylene. More particularly, such fibers may comprise from about 40% to about 60% by weight polypropylene and from about 40% to about 60% by weight polyethylene.

Figure 4:
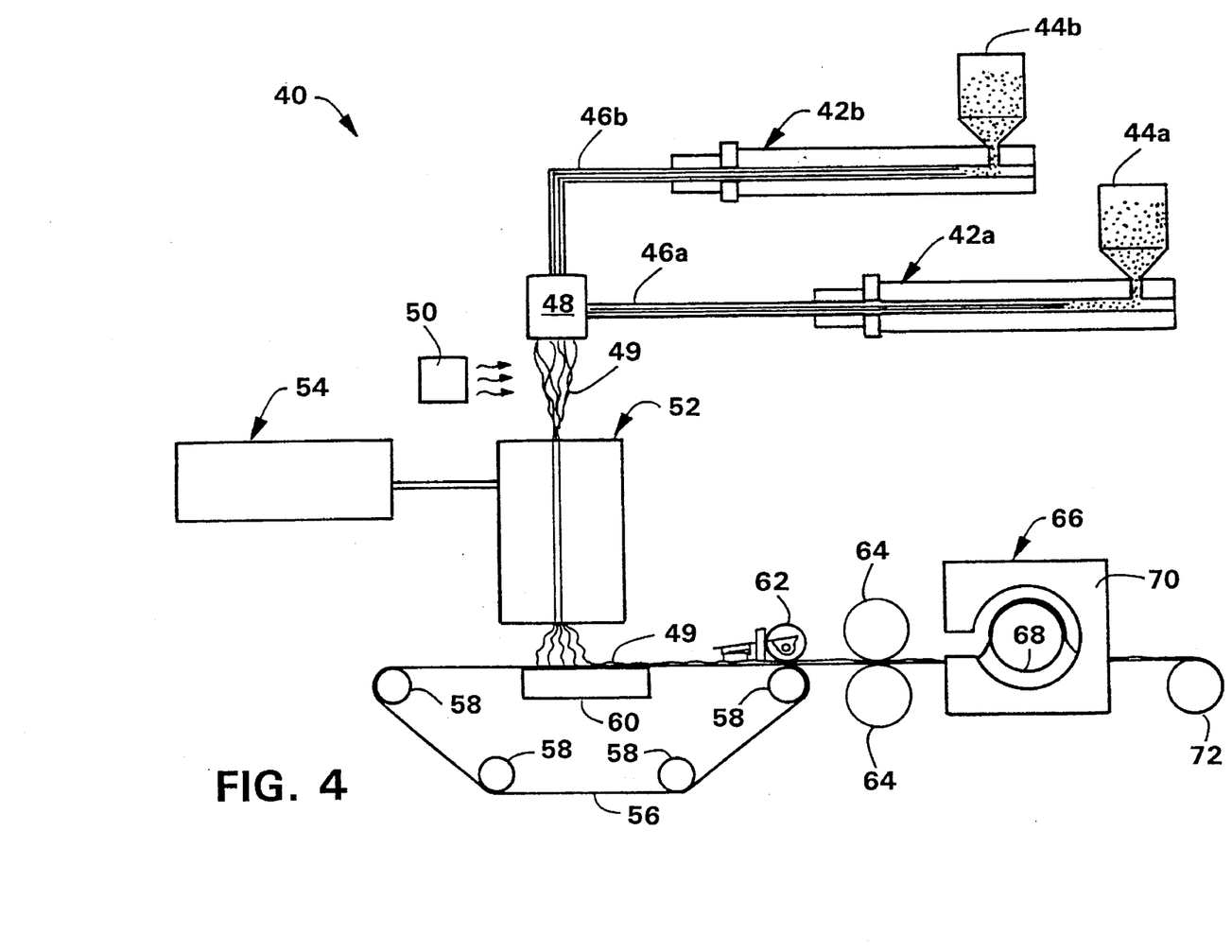
FIG. 4 is a schematic drawing of a process line for making a layer of one of the embodiments of the present invention.

A desirable method of forming suitable polymeric components A and B into a spiral-shaped fiber is the process line 40 illustrated in FIG. 4. While the process line 40 will be described as forming a fiber having two components, it will be understood that fibers produced by process line 40 may be formed from a plurality of components in excess of two.

The process line 40 includes a pair of melt extruders 42a and 42b for separately heating, melting and extruding molten polymer components A and B. A first hopper 44a feeds component A into the extruder 42a. A second hopper 44b feeds component B into the extruder 42b. The temperature of each extruder will vary depending upon the nature of the particular polymer. As such, the temperatures of each extruder, 42a and 42b, may range from about 370° F. to about 530° F. and more particularly, may range from about 400° F. to about 450° F.

When forming a bi-component fiber, the hydrophilic internal additive, described in greater detail below, may be added to the polymer melt in one of several ways. Generally, the concentration of the internal additive in the bi-component fiber is between about 0.1% to about 5.0% and specifically between about 0.25% to about 5.0% and more specifically between about 1.0% to about 1.5% of the combined weight of components A and B. It has been found that when the internal additive is present at concentrations of 0.25% by wt. or less, additional heat may be required to cause the internal additive to migrate to the fiber surface. Generally, this additional heat may be applied once the fibrous web has been formed.

Desirably, a internal additive, described in greater detail below, may be formulated with a thermoplastic which may be dry blended, via introduction into either of the polymer containing hoppers 44a or 44b, in predetermined ratios to yield the desired internal additive concentration. Another method of adding the internal additive may be via metering a desired quantity of additive directly into one or both of the extruders, 42a or 42b.

The polymer components A and B exit their respective extruders, 42a and 42b, and enter into their respective conduits 46a and 46b. These conduits converge into a spinneret 48.

Spinnerets for extruding bi-component fibers, in either side-by-side or sheath/core orientation, are well known and generally include a housing containing a spin pack (not illustrated). The spin pack includes a plurality of plates staked one on top of the other with a pattern of openings arranged to create flow paths for directing polymer components A and B through the spinneret 48. As a result, a curtain of bi-component fibers 49 is extruded from the spinneret 48.

A blower 50 is positioned near the curtain of bi-component fibers 49. As the bi-component fibers 49 exit the spinneret 48, a flow of cooling air (generally perpendicular to the filaments and between about 45° F. to about 90° F. at a flow rate of about 100 to 400 ft/sec) from the blower 50 contacts the fibers 49. As the bi-component fibers cool, these fibers develop a latent spiral crimp.

A fiber draw unit or aspirator 52 is positioned about 30 to 60 inches below the bottom of the spinneret 48. The unit 52 receives the cooled bi-component fibers 49. Such units which are suitable for use in the process line 40 are of the type Shown in U.S. Pat. Nos. 3,802,817, 3,692,618 and 3,423,266, the disclosures of which are incorporated herein by reference.

Generally described, the fiber draw unit 22 includes an elongated vertical passage through which the bi-component fibers are drawn by aspirating air entering from the sides thereof and flowing through such passage. A heater 54 supplies aspirating air to the fiber draw unit 52.

The temperature of the air supplied from the heater 54 is sufficient to heat the fibers 49 to a temperature sufficient to activate the latent spiral crimp. The temperature required to activate the latent spiral crimp ranges from about 60° F. to a maximum temperature less than the melting point of the lower melting component.

The temperature of the air from the heater 24 and thus the temperature to which the fibers 49 are heated can be varied to achieve different degrees of spiral. Generally, by adjusting the air temperature produced by the heater 54, one may alter the density, pore size distribution and drape of the final product.

An endless foraminous forming surface 56 is positioned for receiving the spiral bi-component fibers 49 from the fiber draw unit 52. The forming surface 56 travels around guide rollers 58. The spiral bi-component fibers 49 are drawn against the forming surface 56 by a vacuum 60.

The bi-components fibers 49 are compressed before leaving the forming surface by a compression roller 62. The compressed bi-components fibers 49 may be bonded, such as thermal point bonded by rollers 64 or through-air bonded by structure 66. The through-air bonder 64 generally includes a perforated roller 68, which receives the web, and a hood 70 surrounding the roller 68.

Generally, the air temperature in the through-air bonder 66 is above the melting point of the lower melting point component but below the melting point of the higher melting point component. In this way, the bi-component fibers are bonded together by contact between the lower melting point components. A winding roll 72 collects the finished product.

It will be understood that other embodiments of the present invention may include an absorbent structure having more than two layers. These additional layers may be porous or non-porous, woven or nonwoven, pervious or impervious films, foams or a combination thereof.

The layers of the absorbent structure may be combined by several methods so as to form the above described juxtaposed and contacting relationship. For example, the layers of the absorbent structure of the present invention may be formed separately and then laminated together or one layer may be formed directly on top of another.

Alternately, the layers may be formed in series, simultaneously, by placing the layer forming units in series. These layers may also be bonded. Bonding may be accomplished by several methods, including, for example, hydroentanglement, needling, ultrasonic bonding, adhesive bonding and thermal bonding.

When the two layers are formed in-line and the first layer is formed from a bi-component fiber of polypropylene/polyethylene, the second layer may include a blend polypropylene and polybutylene as described in U.S. Pat. No. 5,204,174 assigned to Kimberly-Clark Corporation and herein incorporated by reference. Generally, the percent by weight of polybutylene in the second layer may range from between 5% to 50% and particularly from between 15% to 40% and more particularly from between 30% to 40%. Generally, the addition of polybutylene to the fibers forming the second layer provides improved adhesion between the fibers of the first and second layers while maintaining sufficient porosity at the interface of these layers.

A suitable internal additive, such as a hydrophilic internal additive, for use in the present invention is generally non-toxic, has a low volatility and is sufficiently soluble in the molten or semi-molten polymer. Additionally, the internal additive is thermally stable at temperatures up to 300° C. and sufficiently phase separates such that such additive migrates from the bulk of the polymer fiber towards the surface of the polymer fiber as the fiber cools without requiring the addition of heat. Once at the polymer surface, the internal additive changes the hydrophobicity of the polymer surface such that the surface of polymer rapidly wets upon contact with an aqueous fluid. Such internal additives include one or a combination of internal additives selected from the following classes of internal additives: (i) polyoxyalkylene modified fluorinated alkyls, (ii) polyoxyalkylene fatty acid esters, (iii) polyoxyalkylene modified polydimethyl siloxanes and PEG-Terephthalate (polyethylene glycol modified terephthatate). An example of a polyoxyalkylene modified fluorinated alkyl is FC-1802. An example of a polyoxyalkylene fatty acid ester is PEG-400 ML. An example of a polyoxyalkylene modified polydimethyl siloxane is MASIL® SF-19. In another embodiment of the present invention the hydrophilic internal additive may be present in thermoplastic fibers forming one or both of the above described porous layers.

Generally, the concentration (percent by weight of the fiber) of the internal additive in the fibers is between about 0.1% to about 5.0% and specifically between about 0.25% to about 5.0% and more specifically between about 1.0 to about 1.5%. It has been found that when the internal additive is present at concentrations of 0.25% by wt. of the fiber or less, additional heat may be required, as discussed above, to cause the internal additive to migrate to the fiber surface.

Figure 5:
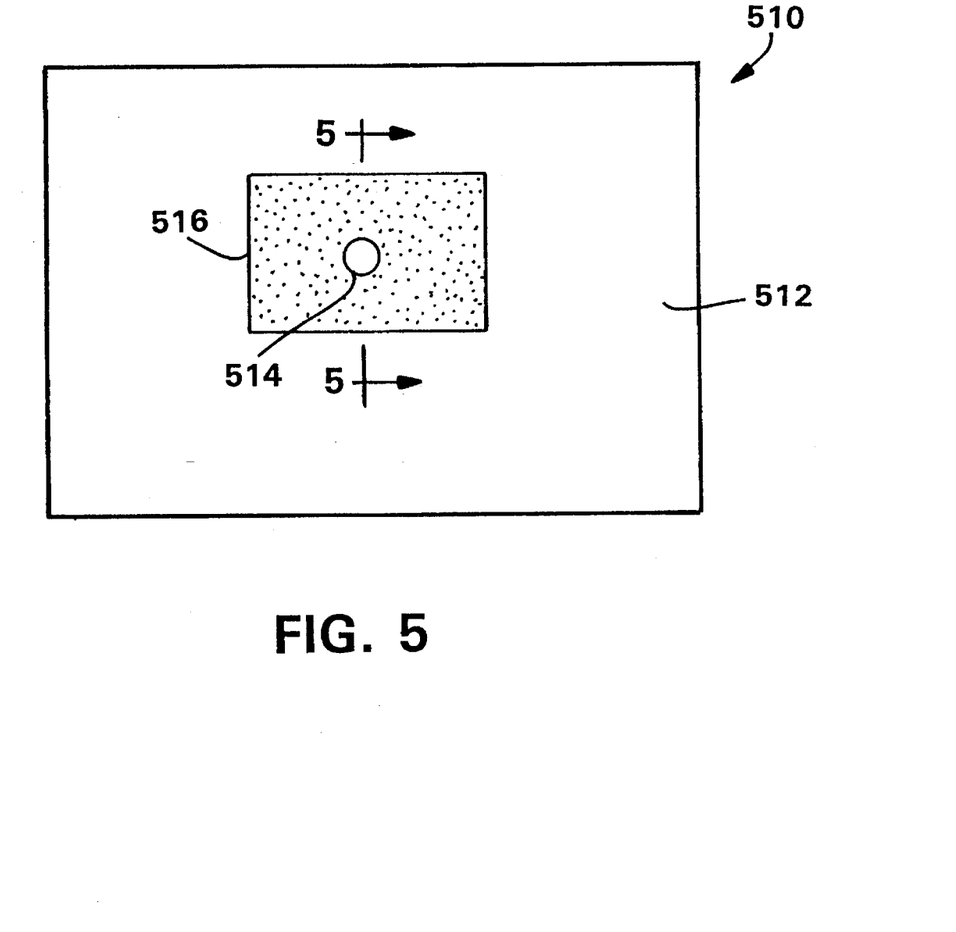
FIG. 5 is a plan view of a surgical drape having a fenestration therein illustrating the absorbent structure of the present invention positioned about the fenestration.

Referring now to FIG. 5, a surgical drape 510 is illustrated. The surgical drape 510 includes a sheet 512 having portions thereof defining an opening 514. The opening 514 is generally sized for overlying the operating site of the patient and for providing a health care provider a means of accessing the site. It will be understood that while the drape 510 is illustrated in FIG. 5 to be generally rectangular in shape, the present invention is equally well suited for use in drapes having a variety of shapes and sizes. The porous structure 516 may function to reinforce the drape 510 and/or provide improved fluid management about and near the opening 514.

Figure 6:
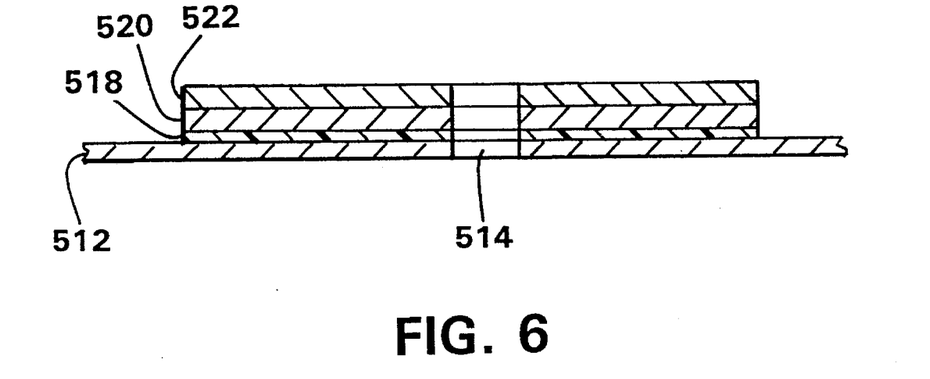
FIG. 6 is a cross sectional view of FIG. 5 along lines 5—5.

A porous structure 516 is secured to the sheet 512 around and/or adjacent the opening 514. Referring now to FIG. 6, the porous structure 514 is formed from three material layers, 518, 520 and 522. The layer 518 is desirably a liquid impervious, non-porous film. By way of example only, such a film suitable for use in the present invention includes a Catalloy film. The thickness of the layer 518 may be from about 0.5 to about 2.0 mils, and more desirably from about 0.75 to about 1.25 mils.

The layer 518 may be secured to the sheet 512 and to the layer 520 by several methods which are well known by those skilled in the art. Particularly, such securing methods may include the application of aqueous or hot-melt adhesive to the surfaces of the layer 518.

The layers 520 and 522 are similar in both form and function to the second and first porous layers 24 and 22, respectively, which are described in detail above. As such, the layer 522 functions to rapidly absorb, distribute and urge fluids coming in contact therewith. The layer 520 functions to receive and distribute the fluids urged theretowards by the layer 522. The layer 518 functions to prevent the fluids received and distributed by the layer 520 from contacting the sheet 512.

Figure 7:
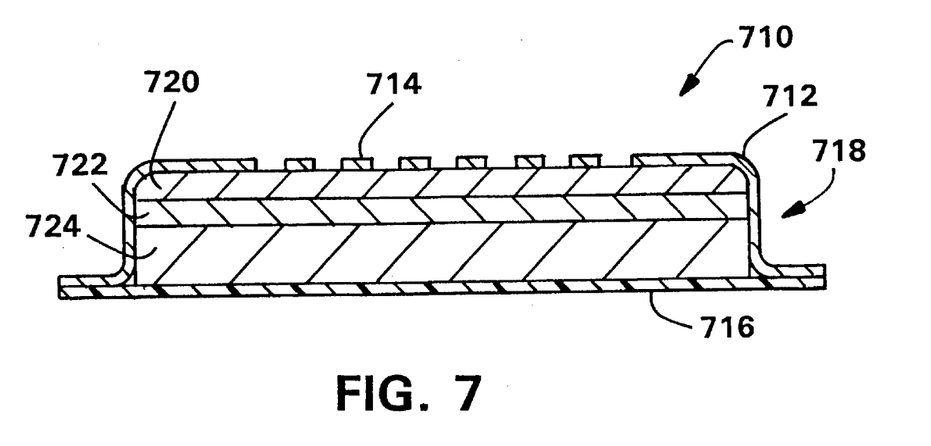
FIG. 7 is a cross sectional view of a portion of a sanitary napkin.

Referring now to FIG. 7, an absorbent article 710, such as for example a sanitary napkin, is illustrated in cross section. A top cover 712, having a perforated portion 714, and a liquid impermeable bottom cover 716 capture a multi-layered laminate absorbent structure 718.

The multi-layered laminate structure 718 includes two outer layers 720 and 724 separated by an intermediate layer 722. The layers 720 and 722 are similar in both form and function to the first and second porous layers 22 and 24, respectively, which are described in detail above.

The layer 724 may be formed from natural or synthetic fibers, including cellulose fibers, surfactant-treated melt-extruded fibers, wood pulp fibers, regenerated cellulose or cotton fibers, or co-form fibers, which is a blend of pulp and synthetic meltblown fibers. The desired materials for use in a sanitary napkin are wood pulp fluff and co-form fibers. An important function of the layer 724 is to provide fluid storage capacity for the absorbent article 710.

In operation, fluid entering the absorbent article 710 via the perforations in the portion 714 contact the layer 720. Fluids contacting the layer 720 are absorbed, distributed and urged as described above. Fluids urged from the layer 720 to the layer 722 are absorbed and distributed within the layer 722. Desirably, the fluid flow characteristics of the layer 722 are such that the fluids at the interface between layers 720 and 722 are absorbed by layer 722 and then urged towards and absorbed by the layer 724.

Stain masking may be improved by improved fluid distribution in the z axis of the surge layer. In the case of the absorbent article 710, stain masking is further improved by not only improved fluid distribution in the z axis of the layer 720 but also by improving the fluid flow characteristics in the x, y and z axes of layer 722 prior to fluid deposition on to layer 724. In this way, a sufficient portion of the staining fluid initially contacting the layer 720 is ultimately contained in the layer 724 and not on the more visible layers 720 and 722 of the absorbent article 710.

The following examples demonstrate the improved fluid management capabilities of the present invention. Such examples, however, are not to be construed as limiting in any way either the spirit or scope of the present invention.

EXAMPLE 1

In order to illustrate the foregoing invention, a three layer laminate was formed which consisted of a first porous layer, a second porous layers and a film layer. The first porous layer was a spunbonded (SB) web formed according to the following specifications.

SPUNBOND DESCRIPTION:

Filament Configuration: Side-by-side bi-component

Spinhole geometry: 0.6 mm D. 4:1 L/D

Polymer A: Exxon 3445 100% polypropylene (homopolymer)

Polymer B: Exxon 9355 random copolymer (3% ethylene/97% polypropylene)

Ratio A/B: 50/50

Melt Temp (F): 430° F. (both)

Spinhole Thruput (GHM): 0.5–0.9 ghm (Grams/hole/minute)

QA Flow (SCFM/in): 45

QA Temp(F): 55°–65° F.

Feed Air Temp (F): 160° F.

Bond Type: Thermal, Wire-Weave pattern

Bond Temp: 245° F.

Basis Wt.(osy): 0.7 to 1.0 osy

Denier: 2.0–3.0 dpf

Caliper: 0.026" inch (same as "caliper")

Density: 0.052

Hydrophilic Internal Additive: MASIL® SF-19 added to both polymer A and polymer B. Total concentration of MASIL® SF-19 present in the web was 1.25% by wt.

The second porous layer was a meltblown (MB) layer formed according to the following specifications.

MELTBLOWN

Basis Weight: about 2.0 osy

Polymer Type: Exxon 3746, 800 melt flow rate polypropylene OR Himont PF-015 400 melt flow rate polypropylene Fiber Size: 2.0–3.0 microns Melt Temp: 465° F.

Throughput: 3.0 pih (lbs per inch per hour across spinning die)

FILM DESCRIPTION

Film Type: 1.0 mil Edison Plastics "CATALLOY".

Melting Points: 230°–248° polyethylene component, and 329° for the polypropylene component.

The first, second and film layers were pin-bonded together per the follow specifications:

Laminate bond type: Thermal, "Ramish" pattern.

Laminate bond temp: 200° F. anvil (film side), 280° F. Pattern (SB side)

Laminate bond pressure: 900 psig

In addition to bonding the first, second and film layers together, the above laminate bonding may also be used to secure all three layers to absorbent fenestration fabric with film backing.

EXAMPLE 2

A three layer laminate was formed which was similar to the laminate of EXAMPLE 1 except that the laminate was through-air bonded at 270° F.

EXAMPLE 3

A three layer laminate was formed which was similar to the laminate of EXAMPLE 1 except that the spunbond layer was formed from a bi-component fiber wherein Polymer A was polypropylene and Polymer B was polyethylene.

EXAMPLE 4

A three layer laminate was formed which was similar to the laminate of EXAMPLE 3 except that the laminate was through-air bonded at 270° F.

EXAMPLE 5

A two layer laminate structure, in accord with the foregoing invention, was also formed and included a first porous layer and a second porous layer. The first porous layer was formed from a spunbond (SB) web formed according to the following specifications:

SPUNBOND DESCRIPTION

Filament Configuration: Round S/S

Spinhole geometry: 0.6 mm D, 4:1 L/D

Polymer A:
 98% Exxon
 3445 (Polypropylene)
 2% $TiO_2$

Polymer B:
 98% Dow
 6811A (Linear Low Density Polyethylene)
 2% $TiO_2$

Ratio A/B: 50/50

Melt Temp(F.): 450° F.

Spinhole Thruput(GHM): 0.6

QA Flow (SCFM/in): 45

QA Temp(F.): 65

Feed Air Temp(F.): 160

Bond Type: Thru-Air

Bond Temp(° F.): 262

Basis Wt.(osy): 1.0

Denier: 3.0

Crimp Type: Helical

Density(g/cc): 0.053

Caliper(in): 0.025

Hydrophilic Internal Additive: FC 1802 (2.0% by wt)

The second porous layer was formed from a meltblown web formed according to the following specifications:

MELTBLOWN DESCRIPTION

The meltblown (MB) web was through-air bonded to the spunbond layer via an in-line process. The meltblown web was formed from: 40% Duraflex DP8910 (6% ethylene, 94% butylene copolymer), a product of Shell Chemical Company of Houston, Tex.; 30% PD 3445 polypropylene available from Exxon of Houston, Tex.; 2% FC-1802; and 28% reactor granules of polypropylene having about 500 ppm of peroxide applied thereto. The density of the resulting meltblown web was 0.115 g/cc. The basis wt. of the resulting meltblown web was 1.54 osy.

EXAMPLE 6

To illustrate improved fluid management provided by the present invention, the products of EXAMPLES 1–5 were compared to other absorbent structures, which are described in greater detail below. Each absorbent structure sample was cut into squares (either 8"×8" or 5"×5"). The samples were placed on a horizontal surface with the spunbond layer or foam layer facing up. 2 ml of Bovine blood-oxalate was dispensed onto the center of each sample and the time required for the Bovine blood-oxalate to be completely absorbed into the sample was recorded.

The Bovine blood-oxalate used was provided by Cocallco Biologicals, Inc. of Reamstown, Pa. and consists of Bovine red blood cells in ammonium/potassium oxalate. The ammonium/potassium oxalate functions as an anti-coagulate and is present in sufficient quantities so as to prevent the Bovine red blood cells from clotting.

Once the time required for the Bovine blood-oxalate to be completely absorbed into the sample was recorded, the samples were allowed to remain undisturbed for an additional 5 minutes after which, the spunbond and meltblown layers of samples 2, E1, E2, E3, E4 and E5 were de-laminated. The average diameter of the stain present on each of these layers was measured. The above data are recorded in Table 1.

TABLE 1

| Sample | Absorption Time | Foam Stain | Avg. SB Stain | Avg. MB Stain |
|---|---|---|---|---|
| 1 | 14 min 30 sec | 9.6 cm | — | — |
| 2 | 5 min 45 sec | — | 2.9 cm | 9.3 cm |
| E3 | 6 sec | — | 4.8 cm | 8.9 cm |
| E5 | 9 sec | — | 5.8 cm | 7.5 cm |
| E1 | 25 sec | — | 5.1 cm | 7.0 cm |
| E2 | 17.5 sec | — | 4.6 cm | 7.9 cm |
| E5 | 9 sec | — | 4.5 cm | 10.8 cm |

Sample 1 is a two layer laminate consisting of a 1.5 mil polyethylene film adhesively bonded to a 0.040" polyurethane foam.

Sample 2 is a three layer laminate consisting of a 1.0 mil polyethylene film bonded to a 2.65 osy polypropylene meltblown layer and a 1.0 osy polypropylene spunbond layer ultrasonically bonded to the meltblown layer. A hydrophilic surfactant, GEMTEX® SM-33 was topically applied to both the spunbond and meltblown layers of Sample 2. SM-33 is a dioctyl sodium sulfosuccinate surfactant and available through Finetex, Inc. N.J. About 1% by wt. of SM-33 was applied to the meltblown layer and about 0.3% by wt. of SM-33 was applied to the spunbond layer.

Sample E1 is the Example 1 laminate.
Sample E2 is the Example 2 laminate.
Sample E3 is the Example 3 laminate.
Sample E4 is the Example 4 laminate.
Sample E5 is the Example 5 laminate.

EXAMPLE 7

The percent of fluid retention was also measured for the de-laminated spunbond and meltblown layers of samples E2 and E5. Percent fluid retention was determined by weighing and then comparing the wet sample layers to dry sample layers. The data are reported in Table 2.

TABLE 2

| Sample | % Fluid Retention |
|---|---|
| E2-SB | 8 |
| E2-MB | 92 |
| E5-SB | 11 |
| E5-MB | 89 |

E2-SB—Spunbond layer of Example 2
E2-MB—Meltblown layer of Example 2
E5-SB—Spunbond layer of Example 5
E5-MB—Meltblown layer of Example 5

EXAMPLE 8

Samples of spunbond webs were obtained and the absorbance, stain and fluid retention analysis described in EXAMPLEs 6 and 7 were preformed thereon. The spunbond layers were formed from a bi-component fiber, wherein Polymer A was polypropylene and Polymer B was polyethylene. The bi-component spunbond layers of EXAMPLE 8 were prepared in a similar fashion to the spunbond layers of EXAMPLEs 3 and 4, except that these spunbond layers were not bonded to a meltblown web and subsequently de-laminated. Blotter paper was placed under each of the spunbond layers prior to wetting with Bovine blood-oxalate.

The two spunbond webs were analyzed: a 1.0 osy web and a 1.6 osy web. The data are reported in Table 3.

TABLE 3

| Sample | Absorption Time | % Retention | Avg. Strain Diameter |
|---|---|---|---|
| 1.0 osy | <1 sec | 8 | 7.4 cm |
| 1.6 osy | <1 sec | 14 | 7.1 cm |

It was noted that the average stain diameters for the above samples are similar to the stain diameters for the meltblown layers reported in Table 1. The reason for this is believed to be that the blotter paper used in EXAMPLE 8 provided limited absorption of the Bovine fluid. As such, a greater quantity of the Bovine fluid remained at the interface between the spunbond and the blotter paper for an extended period of time rather than being absorbed within the bulk of the paper.

EXAMPLE 9

A sample of a spunbond web and a sample of a co-form web (75% polypropylene spunbond and 25% cellulose) were obtained and the absorbance, stain and fluid retention analysis described in EXAMPLEs 6 and 7 were preformed thereon. Both samples were topically treated with SM-33 (about 1% by wt).

The spunbond sample was a 1.0 osy web having a density of 0.052 g/cc and was formed from polypropylene. The spunbond web of EXAMPLE 9 is similar to the spunbond layer of Sample 2 describe above. The co-form sample was a 2.8 osy web having a density of 0.037 g/cc. The data are reported in Table 4.

TABLE 4

| Sample | Absorption Time | % Retention | Avg. Strain Diameter |
|---|---|---|---|
| SB | 2 min 42 sec | 11 | 3.1 cm |
| Co-form | 1 min 03 sec | 78 | 7.2 cm |

The above EXAMPLEs and test results indicate that the absorbent structures made in accordance with the present invention have superior fluid management characteristics as well as superior stain masking characteristics.

While the invention has been described in detail with respect to specific embodiments thereof, it will be appreciated that those skilled in the art, upon attaining an understanding of the foregoing, may readily conceive of alterations to, variations of and equivalents to these embodiments. Accordingly, the scope of the present invention should be assessed as that of the appended claims and any equivalents thereto.

What is claimed is:

1. A porous structure having:
   a density of at least about 0.01 g/cc; and
   a basis weight of from between about 0.5 osy to about 5 osy, wherein the porous structure is adapted to absorb at least 2 milliliters of fluid Bovine blood-oxalate in less than 45 seconds and upon the passage of about 5 minutes from the moment the Bovine blood-oxalate enters the undisturbed porous structure, greater than about 75% of said fluid is retained by the porous structure.

2. The porous structure of claim 1, wherein the porous structure is formed from fibers.

3. The porous structure of claim 2, wherein the fibers comprise a thermoplastic material and a hydrophilic additive.

4. The porous structure of claim 3, wherein the thermoplastic material is selected from a group consisting of polypropylenes, polyethylenes, polyesters, rayons and polyamides.

5. The porous structure of claim 3, wherein at least some of the fibers are bi-component fibers.

6. The porous structure of claim 5, wherein the bi-component fibers comprise a homopolymer and a random co-polymer.

7. The porous structure of claim 5, wherein a first component of the bi-component fibers is polypropylene and a second component of the bi-component fibers is selected from the group consisting of linear low density polyethylene, high density polyethylene, a co-polymer of propylene and ethylene or a combination of polypropylene and polyethylene.

8. The porous structure of claim 3 wherein the hydrophilic additive is a hydrophilic internal additive selected from the group consisting of polyoxyalkylene modified fluorinated alkyls, polyoxyalkylene modified polydimethyl siloxanes and polyethylene glycol modified terephthalates.

9. The porous structure of claim 1 wherein the basis weight is from between about 1.0 osy to about 3 osy.

10. The porous structure of claim 1 wherein the basis weight is from between 0.7 osy to 1.0 osy.

11. The porous structure of claim 1 wherein upon the passage of about 5 minutes from the moment the Bovine blood-oxalate enters the undisturbed porous structure, greater than about 80% of said fluid is retained by the porous structure.

12. The porous structure of claim 1 wherein upon the passage of about 5 minutes from the moment the Bovine blood-oxalate enters the undisturbed porous structure, greater than about 92% of said fluid is retained by the porous structure.

13. A porous structure comprising:
   a first porous layer having a density of at least about 0.01 g/cc and
   a basis weight of from between about 0.25 osy to about 3 osy, and wherein the first porous layer is adapted to absorb and distribute fluid Bovine blood oxalate therein and to urge said fluid towards;
   a second porous layer juxtaposed upon and in contact with said first porous layer, wherein the second porous layer has a density of at least about 0.01 g/cc and a basis weight of from between about 0.25 osy to about 5 osy, and wherein the second porous layer is adapted to retain said fluid urged by the first porous layer; and
   wherein the porous structure is adapted to absorb at least 2 milliliters of fluid Bovine blood-oxalate in less than 45 seconds and upon the passage of about 5 minutes from the moment the Bovine blood-oxalate enters the undisturbed porous structure, less than 25% of said fluid is retained by the first porous layer and greater than about 75% of said fluid is retained by the second porous layer.

14. The porous structure of claim 13 wherein the first porous layer is formed from melt-extruded thermoplastic fibers which include a hydrophilic additive.

15. The porous structure of claim 14 wherein the hydrophilic additive is the hydrophilic additive of claim 8.

16. The porous structure of claim 13 wherein the second porous layer is formed from fibers and wherein after about 5 minutes from the application of said fluid, between about 8% to about 14% of said fluid is present in the first porous layer and between about 92% to about 86% of the fluid is present in the second porous layer.

17. The porous structure of claim 16 where in the second porous layer is formed from melt-extruded thermoplastic fibers.

18. The porous structure of claim 13 wherein the first porous layer is formed from melt-extruded thermoplastic fibers having a hydrophilic additive and is adapted for urging an aqueous fluid in contact therewith towards the second porous layer; and
   wherein the second porous layer is adapted for receiving said aqueous fluid from the first porous layer.

19. The porous structure of claim 18 wherein the some of the thermoplastic fibers forming the first porous layer are bi-component thermoplastic fibers having a first polymer component and a second polymer component.

20. The porous structure of claim 19 wherein the first component is a homopolymer and wherein the orientation of the first and second polymer components is generally side-by-side.

21. The porous structure of claim 20 wherein the homopolymer is polypropylene.

22. The porous structure of claim 19 wherein the second polymer component is formed from polypropylene and ethylene and wherein the percent by weight of polypropylene is at least about 90% and the percent by weight of ethylene is at least about 0.1%.

23. The porous structure of claim 13 wherein the basis weight of the first layer is from between about 1.0 osy to about 3 osy.

24. The porous structure of claim 13 wherein the basis weight of the first layer is from between 0.7 osy to 1.0 osy.

25. A surgical drape comprising:

portions thereof defining an opening sized for overlying an operative site of a patient;

a porous structure secured to the drape adjacent said opening;

wherein the porous structure comprise the porous structure of claim 13, and wherein the first porous layer is formed from melt-extruded thermoplastic fibers and wherein a hydrophilic additive is present in the melt-extruded fibers of the first porous layer.

26. The porous structure of claim 25 wherein some of the thermoplastic fibers are bi-component thermoplastic fibers having a first polymer component and a second polymer component.

27. The porous structure of claim 26 wherein the first component is a homopolymer and wherein the orientation of the first and second polymer components is generally side-by-side.

28. The porous structure of claim 27 wherein the homopolymer is polypropylene and the second component is selected from the group consisting of linear low density polyethylene, high density polyethylene, a co-polymer of propylene and ethylene or a combination of polypropylene and polyethylene.

29. The porous structure of claim 26 wherein the second component is formed from polypropylene and ethylene and wherein the percent by weight polypropylene is at least about 90% and the percent by weight of ethylene is at least about 0.1%.

30. The porous structure of claim 25 wherein the hydrophilic additive is the hydrophilic additive of claim 8.

31. The porous structure of claim 25 wherein the second porous layer is formed from fibers and wherein after about 5 minutes from the application of said fluid, between about 8% to about 14% of said fluid is present in the first porous layer and between about 92% to about 86% of the fluid is present in the second porous layer.

32. The surgical drape of claim 25 wherein the basis weight of the first layer is from between 1.0 osy to 3 osy.

33. The surgical drape of claim 25 wherein the basis weight of the first layer is from between 0.7 osy to 1.0 osy.

34. An absorbent article comprising:

a cover juxtaposed upon and in contact with an absorbent structure;

wherein the absorbent structure includes;

the porous structure of claim 3 wherein the first porous layer comprises melt-extruded thermoplastic fibers, and wherein a hydrophilic additive is present in the melt-extruded thermoplastic fibers, and wherein the second porous layer is formed from melt-extruded thermoplastic fibers having at least about 5% by weight of polybutylene and at least about 50% by weight of polypropylene, wherein said second porous layer is juxtaposed upon and in contact with said first porous layer, and wherein a third layer is juxtaposed upon and in contact with said second layer and said cover.

35. The absorbent article of claim 4 wherein the basis weight of the first layer is from between about 1.0 osy to about 3 osy.

36. The absorbent article of claim 34 wherein the basis weight of the first layer is from between 0.7 osy to 1.0 osy.

* * * * *

UNITED STATES PATENT AND TRADEMARK OFFICE
CERTIFICATION OF CORRECTION

PATENT NO. : 5,540,979

DATED : July 30, 1996

INVENTOR(S): Ali Yahiaoui et al.

It is certified that error appears in the above-identified patent and that said Letters Patent is hereby corrected as shown below:

Column 4, line 16, "mono-Component" should read --mono-component--;
Column 5, line 62, "polypropylenepolyethylene" should read --polypropylene-polyethylene--;
Column 7, line 56, "B$^1$line" should read --B$^1$ line--;
Column 10, line 37, "Shown" should read --shown--;
Column 16, line 42, "Stain" should read --stain--;
Column 17, line 7, "Stain" should read --stain--;
Column 20, line 15, "claim 3" should read --Caim 13--.
Column 20, line 28, "claim 4" should read --claim 34--.

Signed and Sealed this

Eighteenth Day of March, 1997

Attest:

BRUCE LEHMAN

Attesting Officer

Commissioner of Patents and Trademarks